May 17, 1949.  L. B. RHODES ET AL  2,470,188
SENSIBLE HEAT CONTROL SYSTEM
Filed Dec. 3, 1943  3 Sheets-Sheet 1
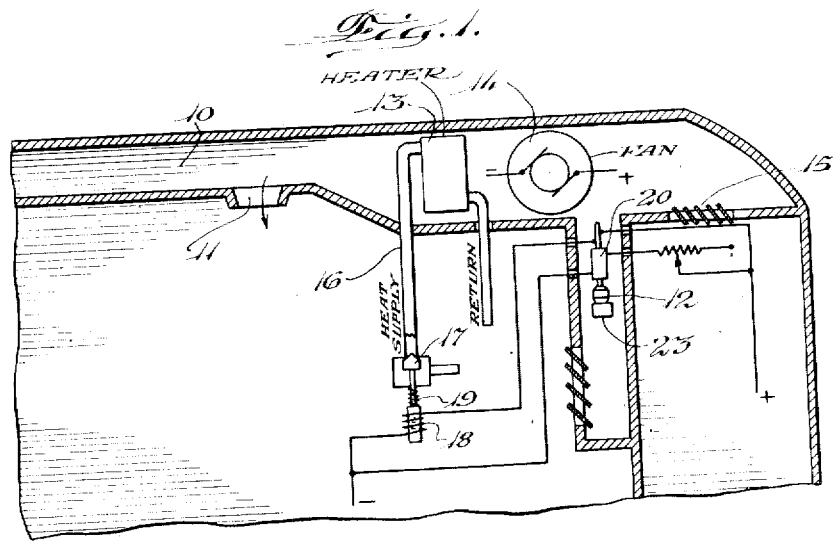
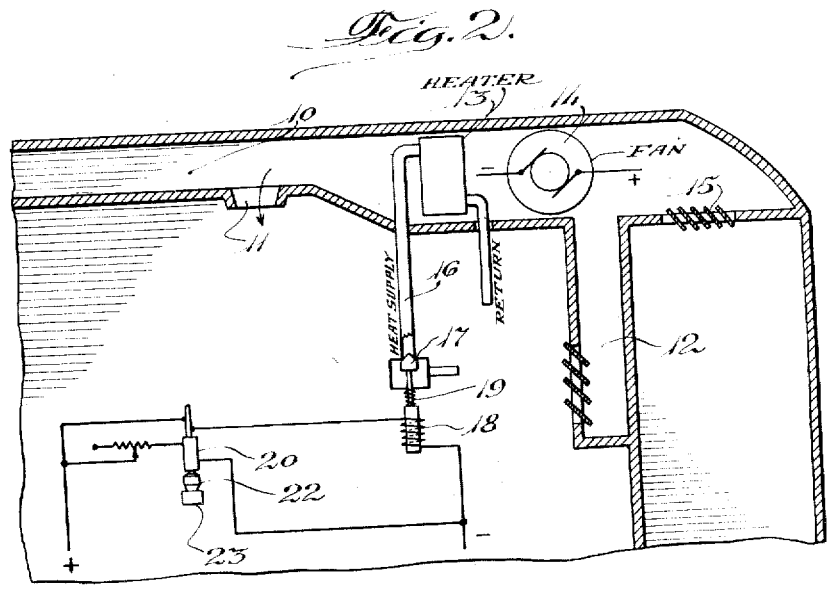
Inventors:
Lewis B. Rhodes
Timothy J. Lehane
By Barnett & Truman
Attorneys

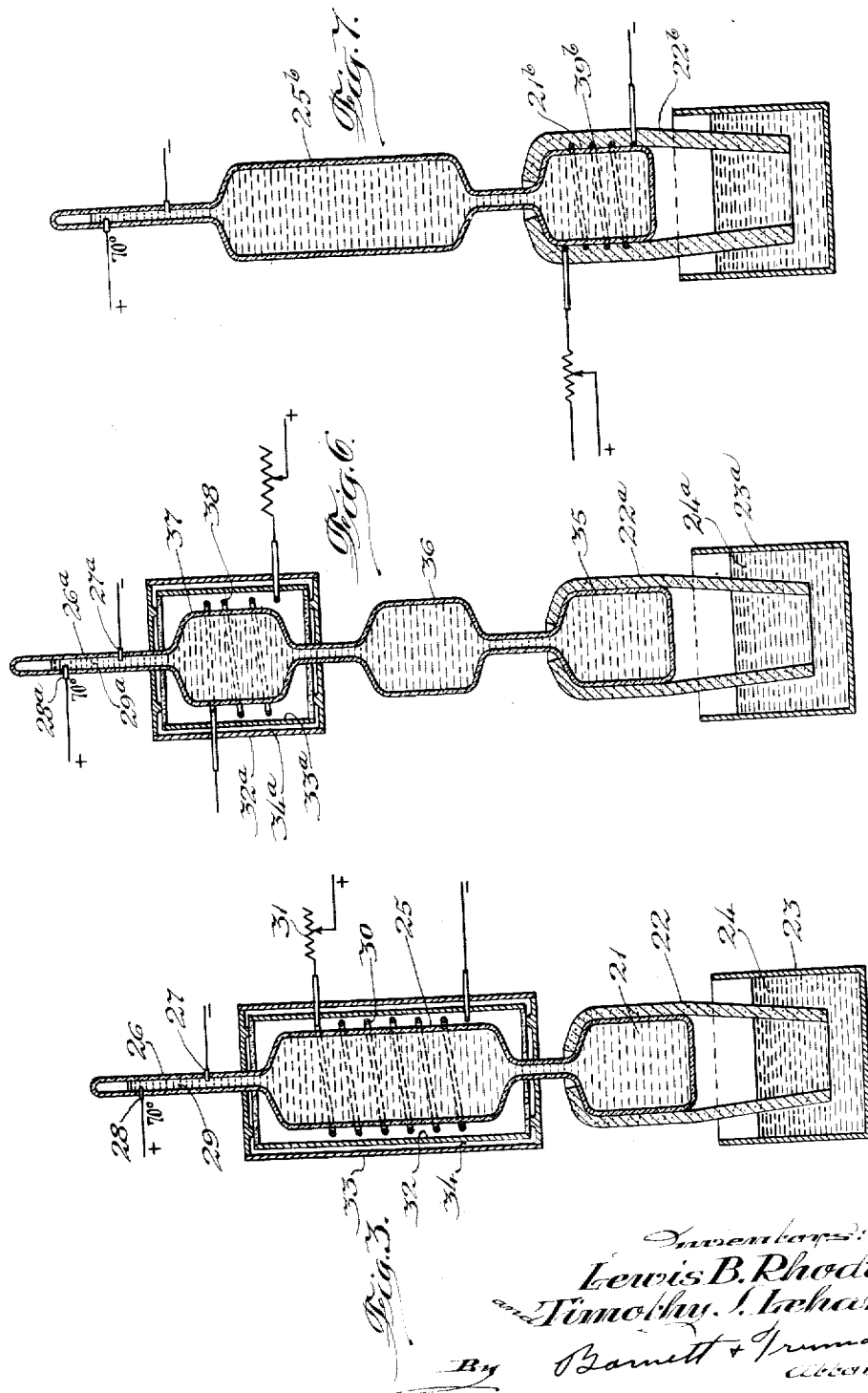

Patented May 17, 1949

2,470,188

UNITED STATES PATENT OFFICE 2,470,188

SENSIBLE HEAT CONTROL SYSTEM

Lewis B. Rhodes, Washington, D. C., and Timothy J. Lehane, Chicago, Ill., assignors, by mesne assignments, to Vapor Heating Corporation, a corporation of Delaware Application December 3, 1943, Serial No. 512,698

14 Claims. (Cl. 236—44)

This invention relates to certain new and useful improvements in temperature control systems and particularly to the provision of an improved thermostat which is constructed to function and thereby to control the temperature of an enclosed space in accordance with the combined wet and dry bulb temperatures of the atmosphere therein.

The principal object of this invention is to provide a control thermostat which will react in a manner similar to that of a human body to the combined temperature and humidity of the atmosphere in an enclosed space. This invention includes improvements whereby an effective temperature thermostat is caused to respond not only to the cooling effect incident to evaporation of moisture adjacent a portion thereof, but also responds to the cooling effect of the air movements within the space independently of the moisture evaporation.

The improved control thermostat is shown herein in the form of a wet bulb thermostat of the mercury column type provided with an auxiliary heater. However, the specific form of thermostat may be varied, provided that the principles are retained whereby the air movements within the controlled space which operate at room temperatures to evaporate and carry away the moisture from the wick of the wet bulb also dissipate a portion of the auxiliary heat and thereby produce a further cooling effect on the thermostat.

The provision of auxiliary heat, in addition to making it possible to obtain the additional cooling effect above described, permits the thermostat to be selectively set to function at any suitable temperature.

In most situations, such as in living rooms, railway passenger cars, etc., the air movements within such space are maintained at about 25 to 50 feet per minute so as to avoid drafts. Such low velocities of air are insufficient to enable a wet bulb thermostat of ordinary construction to give correct indications of the relative humidity of the air within the entire space. It is known, however, that wet bulb thermostats function to give correct indications of the relative humidity of the atmosphere in a space only when the air moves across the wick of the wet bulb at a velocity of at least 500 feet per minute. At the lower air velocities, such as above referred to, a wet bulb thermostat of ordinary construction will give indications of greater humidity than actually exists throughout the controlled space, since the low velocity air is insufficient to carry away the vaporized moisture.

In view of these general conditions and of the fact that the present invention is characterized by its novel reaction to air velocities both above and below the optimum velocity of 500 feet per minute, the invention is illustrated in two general situations wherein either condition may prevail.

If the air movements are such as are normal to an ordinary living room, for example 25 to 50 feet per minute, the amount of external heat added to the thermostat may be, preferably though not necessarily, relatively small, for example, one or two degrees. When the thermostat is located in situations, for example in the return duct of a forced air circulating system where the air velocities are obtained above 500 feet per minute, a large amount of auxiliary heat may be added. In this way, the invention will compensate for the greater dissipation of heat due to the higher velocities of air movement and, therefore, provides an automatic control of the functioning of the thermostat in situations where the air velocity is above 500 feet per minute.

The invention is illustrated in connection with certain alternative arrangements and construction shown in the accompanying drawings wherein:

Fig. 1 is a fragmentary portion of a railway car including a sensitive heat control system constructed in accordance with this invention, that is to say, a heat control system which reacts to the combined effects of temperature, humidity and movement of the atmosphere within a space.

Fig. 2 is a view similar to Fig. 1 but illustrating a modified arrangement of an effective temperature thermostat, forming a part of the control system.

Fig. 3 is a detail view on an enlarged scale of one preferred form of effective temperature thermostat.

Fig. 6 is a detail view of another preferred form of the effective temperature thermostat; and Fig. 7 is a detail view of a third alternative form of thermostat.

Figure 5:
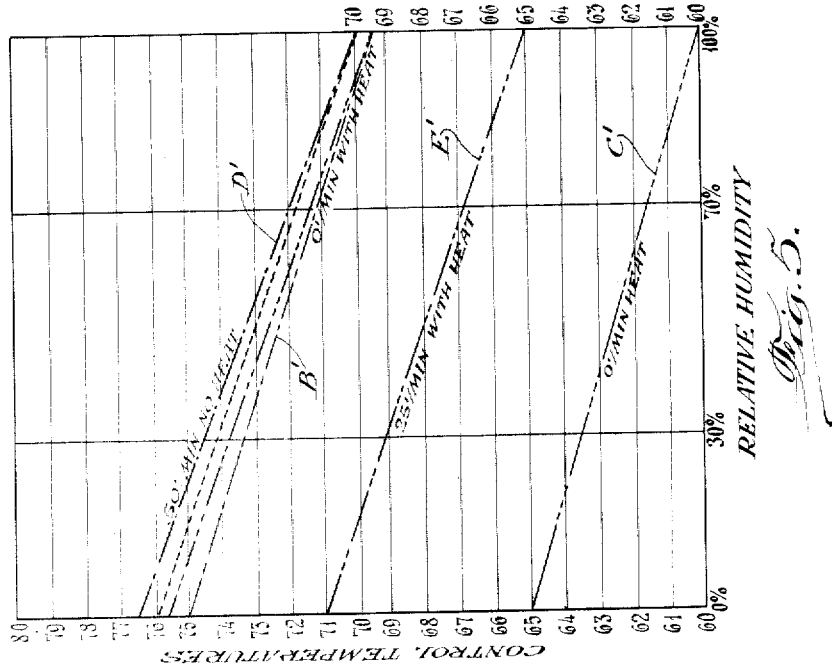
Fig. 5 is a similar chart showing the functioning temperatures when the thermostat is subjected to relatively low air movements.

Referring first to Figs. 1 to 5, inclusive:

The heating system herein illustrated operates to deliver heated air into a railway car or other enclosed space. This form of heating system is used merely for the purpose of convenience and, therefore, is not to be regarded as any limitation on the scope of the invention. The heating system herein shown comprises an overhead air passage 10 having air outlets 11 and having a return air passage 12. A heater 13 is positioned in the passage 10. A motor driven fan 14 forces the air through the heater 13 and into the control space. The size of the return passage 12 is such that the air will move through the passage at greater velocity than does the air within the enclosed space. This makes is possible, as it will be seen hereinafter, to increase the efficiency of the control thermostat without increasing the velocity of the air movements throughout the space being controlled. Part or all of the air to be heated is drawn from the control space through the return air passage 12. If desired, a portion of the air may be drawn through a fresh air inlet 15. 16 designates the steam supply pipe leading to the heater. The flow of steam to the heater is controlled by means of an electrically operated valve 17 which is opened and closed in response to the effective temperature condition of the space being controlled. The valve 17, as herein shown, is moved to its closed position by the energization of a solenoid 18. However, this specific operation can be reversed if desired. When the solenoid 18 is de-energized, a spring 19 serves to open the valve and admit additional steam to flow into the heater 13. The energization of the solenoid 18 is controlled by means of an effective temperature thermostat which is designated as a whole by the reference numeral 20. The thermostats shown in Figs. 1 and 2 may be any one of the thermostats shown in detail in Figs. 3, 6 and 7, or any alternative form coming within the scope of the claims herein. The effective temperature thermostat of Fig. 3 is preferably, though not necessarily, of the mercury column type, provided with a wet bulb 21 which contains approximately one-third of the mercury. A wick 22 encloses the wet bulb 21 and extends into a vessel 23 for containing a quantity of water 24 whereby the liquid absorbed by the wick is evaporated by the air moving across the wick. The amount of liquid evaporated and consequently the cooling effect imparted to the wet bulb depends upon the percentage of moisture contained in the surrounding atmosphere relative to the temperature of the atmosphere and this condition, in turn, depends also upon the velocity of air movements adjacent the wick. A dry bulb portion 25 of the thermostat contains approximately two-thirds of the mercury. The upper end of the thermostat tube is formed into a stem portion 26 of reduced diameter in which electric contacts 27 and 28 are positioned so as to be engaged by the mercury column. The said contacts 27 and 28 are so positioned that the mercury column 29 will close an electric circuit between the contacts when the temperature at the thermostat reaches any one of a series of effective temperatures of equal comfort to the human body. For example, assuming that the thermostat is set to function at 70° with 100% humidity, it will also function at a temperature of 80° at zero percent humidity, or at any intermediate point thereof. Preferably, the dry bulb portion 25 of the thermostat is heated by an electric coil 30. The amount of auxiliary heat supplied to the coil may be varied by means of a rheostat 31. In this way the temperature at which the space will be maintained may be raised or lowered by varying the amount of auxiliary heat added to the thermostat. For the purpose of this description, it will be assumed that the heater 30 is supplied with electric current sufficient to add 10° of auxiliary heat to the dry bulb 25 when the air adjacent the bulb is at zero velocity. The air currents passing into contact with the wick 22 evaporates the moisture therein and thereby effect the cooling action hereinabove mentioned. The dry bulb 25 is influenced by the room temperature so that the combined effects of the room temperature, auxiliary heat and the cooling effect on the wet bulb causes the thermostat to function in accordance with the effective or comfort temperature desired to be maintained in the enclosed space.

Inasmuch as auxiliary heat is supplied to the dry bulb portion of the thermostat, the moving air currents dissipate a portion of the added heat. The thermostat, therefore, responds not only to the cooling effect on the wet bulb but also to the cooling effect on the dry bulb because of the heat dissipation. The degree of the cooling effect on the wet bulb depends upon the velocity of air. If the air is of relatively low velocity, there is less evaporation of moisture, since the moist atmosphere is not readily carried away from the vicinity of the wet bulb. The same is true with regard to the dissipation of the auxiliary heat applied to the dry bulb. However, it is possible to dissipate practically of the auxiliary heat by the use of air of sufficient velocity. For example, if the auxiliary heater is open to the atmosphere and a relatively low current is supplied thereto, it should be possible to dissipate practically all of the added heat with an air movement of approximately 50 feet per minute.

When the air currents used are of the higher velocities, it is desirable to protect the auxiliary heater from the full influence of the air movements. The amount of protection provided in any particular case depends entirely upon the velocity of air in which the instrument is located. In this connection, the invention includes the provision of a simplified protective housing adapted to surround the dry bulb 25 and the auxiliary heater 30. In the present instance the protective housing includes an inner casing 32 and an outer casing 33. The size of the outer casing is preferably such as to provide a dead air space 34 between the two casings so as to reduce the rate of heat transfer. However, the heat transfer, in any event, will be in proportion to the air velocity. When the dry bulb is enclosed in the manner indicated, it will also be influenced in a predetermined proportion by the room temperatures. Inasmuch as the dissipation of the auxiliary heat will vary in relation to variations in air velocities, the functioning of the thermostat may be affected by changes in any one of three conditions, to-wit: the temperature of the atmosphere, the humidity of the atmosphere and the velocity of the atmosphere. It will be understood also that any one of these conditions may vary without affecting the functioning of the thermostat if suitable proportionate changes take place in each of the other conditions above mentioned.

Referring to Fig. 1, it will be seen that the effective temperature thermostat is located in the air return duct 12. In this way the air movement can be maintained at any desired velocity depending upon the temperature requirements of the space. For example, if the air movement is maintained at a velocity of 500 feet per minute, assuming that the wick 22 is free of dust and other foreign matter, the said wick will have maximum cooling effect upon the mercury within the bulb 21, since air moving at 500 feet per minute is sufficient to remove accumulation of vaporized liquid, the effect of localized saturation of the air. However, any greater velocity of air will not increase the vaporizing efficiency of the wick. The only effect on the vaporizing of the moisture by the increased air velocity is the removal of the localized saturation of air adjacent the wick. Any further efficiency in the cooling effect, due to evaporation, must result from change in the relative humidity of the atmosphere throughout the entire space.

In order to amplify the description of the operation of the thermostat, its operation will be described further in connection with the charts, Figs. 4 and 5. Inasmuch as the efficiency of a wet bulb thermostat is lowered by the accumulation of dust and other foreign matter on the wet wick, and in view also of the fact that the effectiveness of the auxiliary heater is varied by the velocity of air, the operation of the device is described with respect to certain assumed conditions. In this connection it will be assumed:

(1) That the cooling effect by evaporation at the wick 22 will be 100% effective with air velocity of 500 feet per minute.

(2) That the cooling effect by evaporation at the wick will be 75% effective with air velocity of 225 feet per minute.

(3) That the cooling effect by evaporation at the wick will be 50% effective with air velocity of zero feet per minute.

In regard to the assumed conditions relative to the effectiveness of the auxiliary heat, it is assumed for the purpose of this description that:

(1) With an air velocity of zero feet per minute the auxiliary heater will be 100% effective.

(2) With an air velocity of 225 feet per minute the auxiliary heater will be 87.5% effective.

(3) With an air velocity of 500 feet per minute the auxiliary heater will be 75% effective.

(4) With an air velocity of 1000 feet per minute the auxiliary heater will be 50% effective.

(5) With an air velocity of 1500 feet per minute the auxiliary heater will be 25% effective.

(6) With an air velocity of 2000 feet per minute the auxiliary heater will be only 5% effective or, for all practical purposes, the entire amount of added heat is dissipated.

Figure 4:
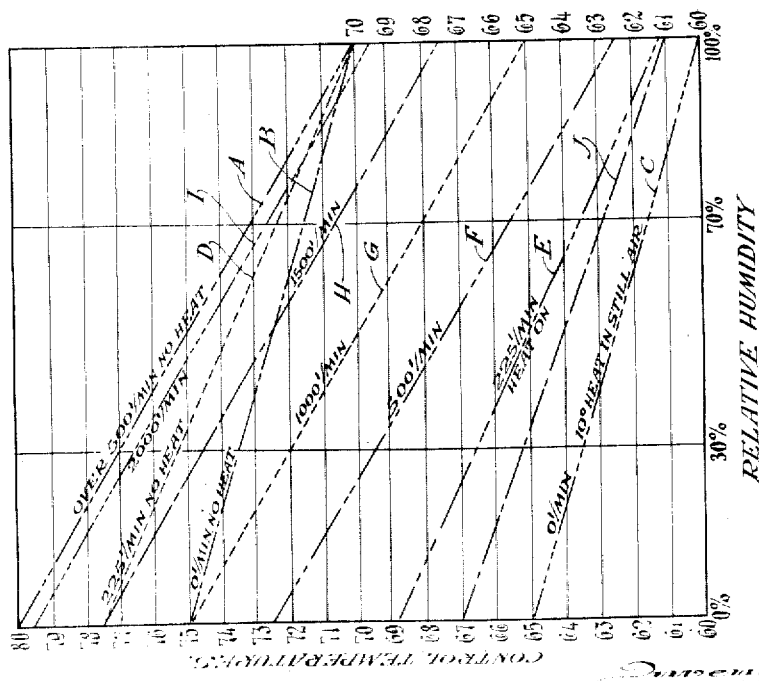
Fig. 4 is a chart showing the functioning temperature at which the thermostat will function for different relative humidities of the atmosphere within the controlled space when the thermostat is subjected to different air velocities.

Referring to the chart shown in Fig. 4 and assuming that the room temperature is 70° at 100% humidity and no auxiliary heat is added to the dry bulb 25 of the thermostat, but that the air movement for evaporated moisture from the wet bulb wick is 500 feet per minute:

The effective temperature for different relative humidities is illustrated by the line A of the chart; the said line indicating that the temperature of 70° at 100% relative humidity is equivalent, in comfort to a human body, to a temperature of 80° at zero humidity, or to any one of the intermediate points on the line.

The line B, extending from 70 to 75°, indicates the effective temperatures for different relative humidities (assuming that the thermostat is 50% effective at zero air velocity) when the air velocity is at zero and no heat is added to the dry thermostat.

If 10° of heat is applied to the dry thermostat, while the air is at zero velocity, the effective control temperatures herein assumed for the various relative humidities, are indicated by the line C which extends from 60° to 65°. However, the added heat will induce a thermal air current to contact the wick which will serve to partially remove the localized saturated air adjacent the wick, and thereby effect greater efficiency than is indicated by said line C.

We will now explain the operating results of the thermostat when it is subjected to both added heat and various air velocities. If the thermostat is subjected to air velocity of 225 feet per minute when no heat is added, the resulting control temperatures are represented by the line D extending from 70° to 77.5°. These specific temperatures are obtained because of the assumption that the cooling effect on the bulb 21, due to evaporation of moisture, will be 75% effective when the air velocity is 225 feet per minute. If 10° of added heat is then applied, the control temperature is represented by the line E extending from 61.2° for 100% humidity to 68.8° for zero humidity. In this connection, it will be observed that the line E represents a loss of 1.2° of added heat because of the assumed effectiveness of air movements at 225 feet per minute. If the air velocity were 500 feet per minute instead of the 225 feet, the control temperatures would be represented by the line F, since under these conditions there will be a heat loss of 2.5° because of the reduced effectiveness of the heater 30 in the presence of air movements of 500 feet per minute. The auxiliary heater 30 is made less and less effective by increases in the air velocity, for example, air movements at 1000 feet and 1500 feet per minute are shown, respectively, by the lines G and H. The line I extends from 69.5° to 79.5° on the chart and indicates the control temperatures existing when the wet bulb is fully effective by reason of the high velocity air and the auxiliary heater is, for all practical purposes, ineffective since practically all of the heat is dissipated.

When the effective temperature thermostat is employed in situations where the air velocities are maintained relatively low, such, for example, as in ordinary living rooms or in the passenger spaces of railway cars, the controlled temperatures are illustrated in the chart shown in Fig. 5. For example, assuming that the auxiliary heater is exposed to the atmosphere of low velocity movement, it will be seen from the assumptions previously made that the control temperatures for various relative humidities will be as shown by line B' when the air movement is at zero velocity, and there is no heat added to the thermostat. The line B' of Fig. 5, therefore, corresponds to the line B of Fig. 4. Also the C' of Fig. 5 will correspond to line C of Fig. 4 under conditions when 10° of heat is applied and the air movement is of zero velocity. This is because the thermostat will be 50% effective under such conditions. The effectiveness of the present thermostat, under these conditions, takes into account the efficiency of the evaporator due to the thermal air currents which are caused to flow across the wick by virtue of the operation of the auxiliary heater. The line E' indicates the control temperatures when the air velocity is 25 feet per minute and heat is applied, since under such conditions the cooling effect on the web bulb will be more effective than indicated by the line C' and the heating effect of the auxiliary heater will be less effective. The line D' indicates control temperatures when the air velocity is 50 feet per minute with no heat. A similar condition is illustrated by line I', it being assumed that when the thermostat is used in situations of low velocity air, the auxiliary heater is so arranged and exposed to the atmosphere that practically all heat therefrom will be dissipated with an air velocity of 50 feet per minute.

Referring now to Fig. 6 which illustrates a modified construction of thermostat in that it includes three bulbs, to-wit, a wet bulb 35 enclosed in a wet wick 22ª in the same manner as described in connection with Fig. 3, a dry bulb 36 which is influenced only by the room temperature, and a second dry bulb 37 to which added heat is supplied by means of an auxiliary heater 38. The dry bulb 37 on the auxiliary heater 38 in this modification may be enclosed in heat insulating casings 32ª and 33ª in the same manner and for the same purpose as described in Fig. 3. The present modification functions in much the same manner as the embodiment shown in Fig. 3 except that the dry bulb 36 is responsive solely to the room temperature and the bulb 37 responds to the room temperature and also to the auxiliary heater, and thereby produces the combined effects of the dry bulb 25 of Fig. 3. However, in the present embodiment, the dry bulb 36 is open to the atmosphere, and, therefore, responds more readily to the room temperatures. In other respects, this thermostat may be and preferably is the same as the embodiment shown in Fig. 3 and is, therefore, given the same reference characters with the exponent $a$.

Referring now to the modified embodiment shown in Fig. 7, a mercury tube corresponding in construction and proportion as shown in Fig. 3 is provided with a wet wick 22ᵇ surrounding the wet bulb 21ᵇ. The dry bulb 25ᵇ is open to the atmosphere so as to respond to the room temperatures. An auxiliary heater 39 is positioned to apply auxiliary heat to the wet bulb 21ᵇ and also to the wick 22ᵇ. The effect of having the auxiliary heater element and wet wick around the same one-third volume bulb tends to increase the evaporation. The cooling effect of this evaporation reduces the effectiveness of the heater. The added heat will also create a thermal draft over the wick. This draft at zero air velocity will remove the air film around the wick and thus allow greater evaporation. The line J in the chart, shown in Fig. 4, extending from 61° to 67°, shows the effect of having the heater element and wet wick arranged in close association with each other, as shown in this modification.

Inasmuch as the rate of heat loss from the thermostats herein shown, due to evaporation, is a function of humidity and air movement, and inasmuch as said air movements tend to dissipate part of the auxiliary heat, the function of each of the thermostats herein shown will be affected by the relative humidity of the atmosphere and by the rate of air movement within the control space in the same manner as the human body would react to the same conditions.

We claim:

1. In a heat control system, means including an electrically energized element for supplying heat to an enclosed space and a control thermostat for opening and closing a control circuit for said element in response to any of a series of effective temperatures of corresponding comfort value within said space; said thermostat including a portion responsive to the temperature of the space, another portion including a cooling element whose effectiveness increases in relation to increased air movements across the thermostat, and means for applying auxiliary heat to the thermostat whereby the functioning temperature at the thermostat is normally greater than the temperature of said space.

2. In a heat control system, means including an electrically energized element for supplying heat to an enclosed space and a control thermostat for opening and closing a control circuit for said element in response to any of a series of effective temperatures of corresponding comfort value within said space; said thermostat including a portion responsive to the temperature of the space, another portion including a cooling element whose effectiveness increases in relation to increased air movements across the thermostat, and an auxiliary heater for the thermostat positioned to be influenced by the air movements across the thermostat, whereby its effectiveness decreases in relation to the increased air movements.

3. In a heat control system, means including an electrically energized element for supplying heat to an enclosed space and a control thermostat for opening and closing a control circuit for said element in response to any of a series of effective temperatures of corresponding comfort value within said space; said thermostat including a portion responsive to the temperature of the space, another portion including a cooling element whose effectiveness increases in relation to increased air movements up to an optimum velocity across the thermostat, and an auxiliary heater for the thermostat positioned to be influenced by the air movements across the thermostat, whereby its effectiveness decreases in relation to the increased air movements both below and above such optimum velocity.

4. In a heat control system, means including an electrically energized element for supplying heat to an enclosed space and a control thermostat for opening and closing a control circuit for said element in response to any of a series of effective temperatures of corresponding comfort value within said space; said thermostat including a portion responsive to the temperature of the space, another portion including a cooling element whose effectiveness increases in relation to increased air movements across the thermostat, an electric heater for supplying auxiliary heat to one of said portions of the thermostat and positioned to be influenced in its effectiveness by air movements across the thermostat, and means for adjustably varying the operating temperatures of said heater.

5. In a heat control system, means including an electrically energized element for supplying heat to an enclosed space and a control thermostat for opening and closing a control circuit for said element in response to any of a series of effective temperatures of corresponding comfort value within said space; said thermostat including a portion responsive to the temperature of the space, another portion including a cooling element whose effectiveness increases in relation to increased air movements across the thermostat, an electric heater for supplying auxiliary heat to one of said portions of the thermostat and positioned to be influenced in its effectiveness by air movements across the thermostat, and an enclosure for the heater to prevent excessive dissipation of heat therefrom.

6. In a heat control system, means including an electrically energized element for supplying heat to an enclosed space and a control thermostat for opening and closing a control circuit for said element in response to any of a series of effective temperatures of corresponding comfort value within said space; said thermostat including a portion responsive to the temperature of the space, another portion including a cooling element whose effectiveness increases in relation to increased air movements across the thermostat, an electric heater for supplying auxiliary heat to the first mentioned portion of the thermostat and positioned to be influenced in its effectiveness by air movements across the thermostat, and an enclosure for the heater to prevent excessive dissipation of heat therefrom comprising a plurality of casing members spaced apart to provide a dead air space between them.

7. In a heat control system, means including a heater and an electrically energized device for supplying heat to an enclosed space, means including an air return duct for directing air at increased velocity from the said space to said heater and a combination wet and dry bulb thermostat in said air return duct for opening and closing a control circuit for said electrically energized device in response to any of a series of effective temperatures of corresponding comfort value, said thermostat including an evaporator cooling element whose effectiveness increases in relation to increased air movements across said thermostat up to an optimum velocity and an auxiliary heater for a portion of the thermostat, which heater is positioned in the path of the return air, whereby its effectiveness in applying heat to the thermostat is decreased in relation to increases in air movements both below and above said optimum velocity.

8. In a heat control system, means including a heater and an electrically energized device for supplying heat to an enclosed space, means including an air return duct for directing air at increased velocity from the said space to said heater and a wet bulb thermostat in said air return duct for opening and closing a control circuit for said electrically energized device in response to any of a series of effective temperatures of corresponding comfort value, said thermostat including an evaporator cooling element whose effectiveness increases in relation to increased air movements across said thermostat up to an optimum velocity, an auxiliary heater for a portion of the thermostat, which heater is positioned in the path of the return air, whereby its effectiveness in applying heat to the thermostat is decreased in relation to increases in air movements both below and above said optimum velocity, and means for adjustably varying the operating temperature of said heater so as to raise or lower the effective temperature at which the thermostat functions.

9. An effective temperature thermostat of a mercury column type for opening and closing an electric circuit comprising a dry bulb portion responsive to room temperature, a wet bulb portion, a moisture evaporating element for applying a cooling effect to the wet bulb portion, and means for applying auxiliary heat to the thermostat whereby the functioning of the thermostat will vary both as to the cooling and heating effects thereon in relation to variations in the velocity of air movements across the thermostat.

10. An effective temperature thermostat of a mercury column type for opening and closing an electric circuit comprising a tube formed with a dry bulb containing approximately two-thirds of the mercury and adapted to respond to the dry bulb temperature of the atmosphere and to a predetermined amount of auxiliary heat and a wet bulb for containing one-third of the mercury, means for supplying moisture to the wet bulb whereby the evaporation of said moisture applies a cooling effect on the thermostat, and means for applying auxiliary heat to the dry bulb whereby the thermostat is caused to function at a dry bulb temperature higher than the temperature of the surrounding atmosphere.

11. An effective temperature thermostat of a mercury column type for opening and closing an electric circuit comprising a tube formed with a dry bulb containing approximately two-thirds of the mercury and adapted to respond to the dry bulb temperature of the atmosphere and to a predetermined amount of auxiliary heat and a wet bulb for containing one-third of the mercury, means for supplying moisture to the wet bulb whereby the evaporation of said moisture applies a cooling effect on the thermostat, and an electric heater for applying auxiliary heat to the dry bulb of the thermostat, whereby the thermostat is caused to function at a dry bulb temperature higher than the temperature of the surrounding atmosphere.

12. An effective temperature thermostat of a mercury column type for opening and closing an electric circuit comprising a tube formed with a bulb containing approximately one-third of the mercury adapted to respond to the dry bulb temperature of the atmosphere, another bulb containing approximately one-third of the mercury and also adapted to respond to the dry bulb temperature of the atmosphere and a wet bulb for containing one-third of the mercury, a wick enclosing the wet bulb for supplying liquid thereto, whereby the evaporation of liquid applies a cooling effect to the thermostat in relation to the amount of liquid evaporated, and a heater for applying auxiliary heat to one of said bulbs at a location to induce increased air movements across said wick to increase the evaporation in normally still air.

13. An effective temperature thermostat of a mercury column type for opening and closing an electric circuit comprising a tube formed with a bulb containing approximately two-thirds of the mercury and adapted to respond to the dry bulb temperature of the atmosphere, and a wet bulb for containing one-third of the mercury, a wick enclosing the wet bulb for supplying liquid thereto, whereby the evaporation of liquid applies a cooling effect to the thermostat in relation to the amount of liquid evaporated, and an electric heater arranged in close relation to said wet bulb for applying auxiliary heat to the thermostat and adapted to induce increased air movements across said wick to increase the evaporation in normally still air.

14. An effective temperature thermostat of a mercury column type for opening and closing an electric circuit comprising a tube formed with a bulb containing approximately two-thirds of the mercury and adapted to respond to the dry bulb temperature of the atmosphere, and a wet bulb for containing one-third of the mercury, a wick enclosing the wet bulb for supplying liquid thereto, whereby the evaporation of liquid applies a cooling effect to the thermostat in relation to the amount of liquid evaporated, and an electric heater arranged in close association to said wet bulb and said wick for applying auxiliary heat to the thermostat and for increasing the evaporation of liquid from said wick.

LEWIS B. RHODES.
TIMOTHY J. LEHANE.

(References on following page)

REFERENCES CITED

The following references are of record in the file of this patent:

UNITED STATES PATENTS

| Number | Name | Date |
|---|---|---|
| 1,459,391 | Clausen | June 19, 1923 |
| 2,046,578 | Parks et al. | July 7, 1936 |
| 2,214,700 | Newton | Sept. 10, 1940 |
| 2,256,127 | Smith | Sept. 16, 1941 |
| 2,261,582 | Haines | Nov. 4, 1941 |
| 2,398,333 | Shoemaker | Apr. 9, 1946 |